(No Model.) 2 Sheets—Sheet 1.
F. JONAS.
EXCAVATING MACHINE.
No. 265,325. Patented Oct. 3, 1882.
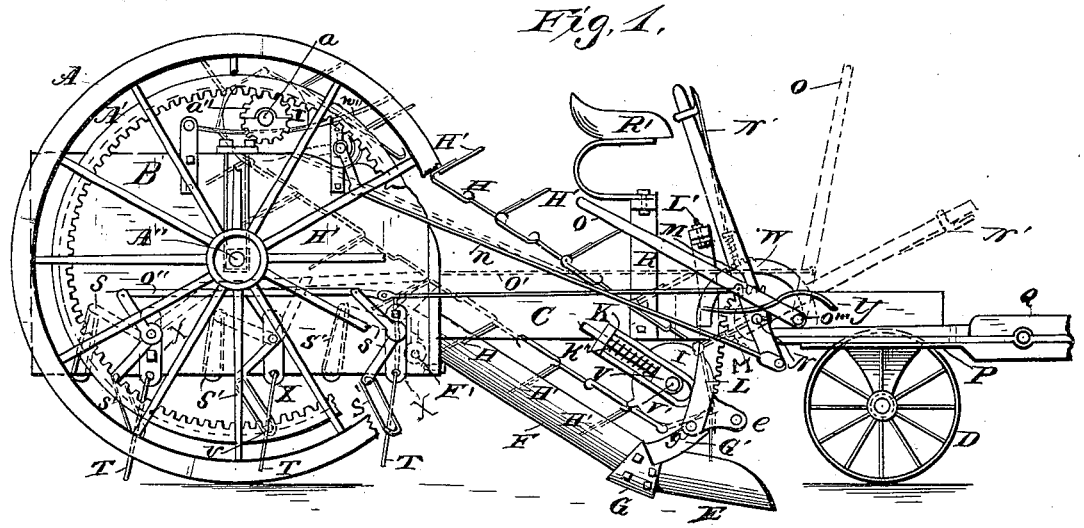
Fig. 1.
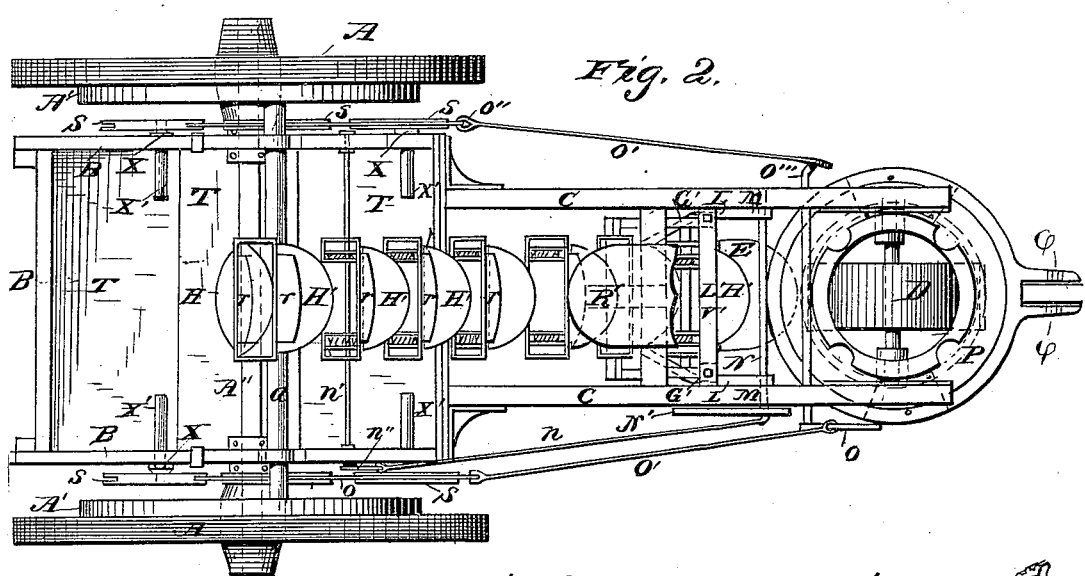
Fig. 2.
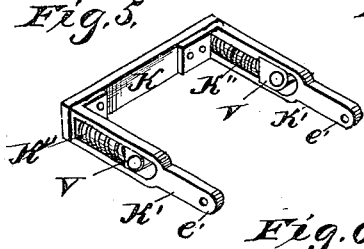
Fig. 5. Fig. 3.
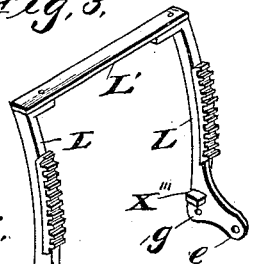
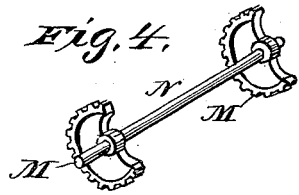
Fig. 4.
Fig. 6.
WITNESSES:
Franck L. Ourant
Will. C. Garman
INVENTOR,
Fredrick Jonas
By James T. Drummond
Attorney

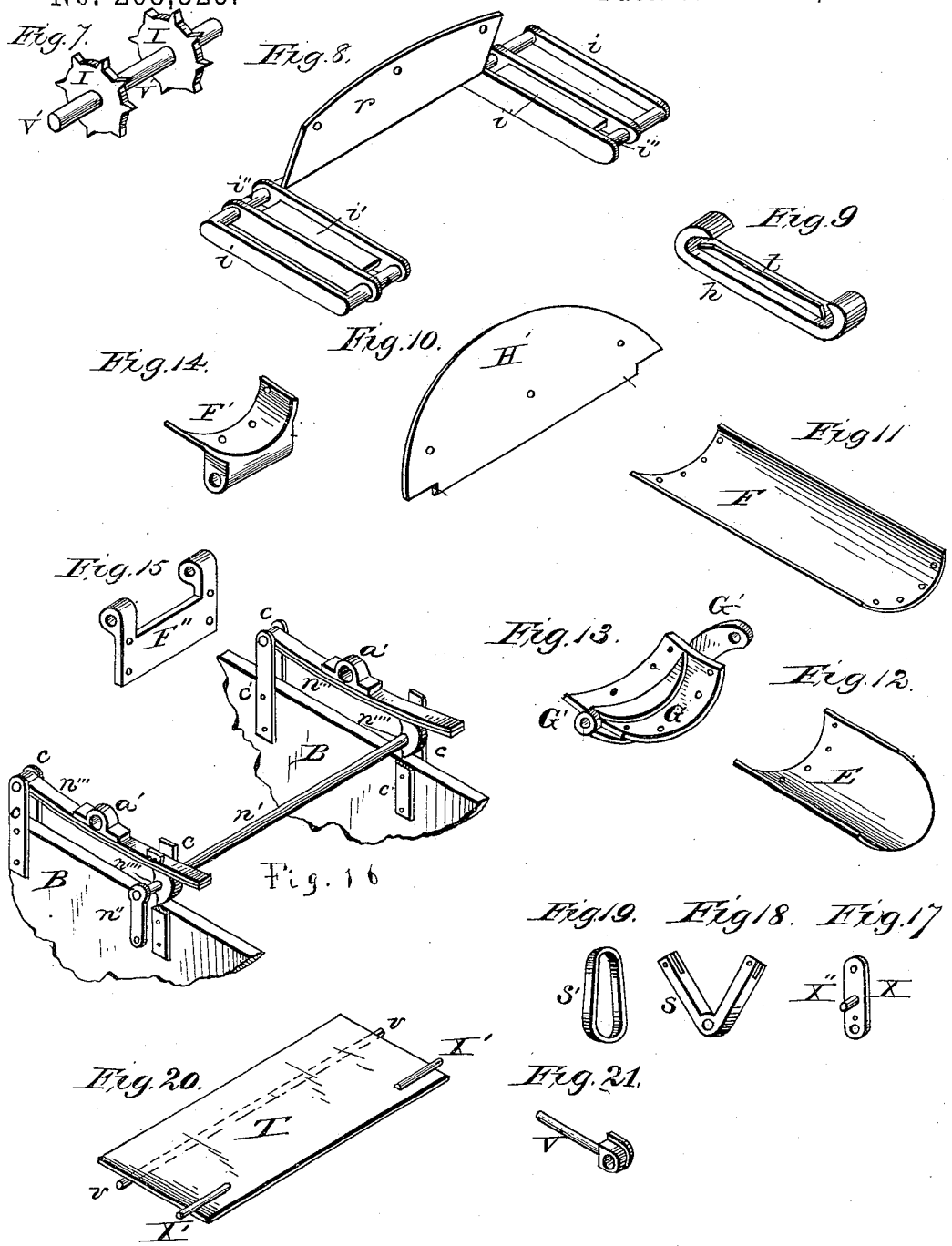

UNITED STATES PATENT OFFICE.

FREDRICK JONAS, OF MOUNT PLEASANT, IOWA, ASSIGNOR OF ONE-HALF TO JESSE STUBBS, OF SAME PLACE.

EXCAVATING-MACHINE.

SPECIFICATION forming part of Letters Patent No. 265,325, dated October 3, 1882.

Application filed February 6, 1882. (No model.)

*To all whom it may concern:*

Be it known that I, FREDRICK JONAS, a citizen of the United States, residing at Mount Pleasant, in the county of Henry and State of Iowa, have invented certain new and useful Improvements in Excavating-Machines, of which the following is a specification.

My invention relates to that class of excavating-machines designed to plow and elevate dirt into their boxes or receptacles for transportation, and, when thus loaded, serve as implements for moving it to such locality as may be desired, and there dumping it.

The object of my invention is to provide better mechanism than has hitherto been known for the several purposes herein specified—viz, first, for raising and lowering the plow and the parts connected therewith in their adjustments, so as to either plow dirt and deposit it in the excavator-box or carry the plow above ground while traveling; secondly, for elevating dirt from the plow to the excavator-box; thirdly, for shifting the elevating device in and out of gear with the main drive-wheels of the machine; fourthly, for operating the dumping device of the machine.

My invention consists of the several combinations herein shown for accomplishing the above-named objects, which are hereinafter distinctly described, and illustrated by drawings having accompanying reference-letters, and particularly set forth in the claims hereunto attached.

In the accompanying drawings, constituting part of this specification, in which similar letters of reference indicate like parts throughout the different figures, and dotted lines not otherwise explained parts hidden from view, Figure 1 is a side elevation of the machine embodying my invention, with the plow lowered for plowing dirt, and the elevating device geared for elevating dirt to the box, and the trap-doors or drop-bottoms lowered for dumping. It also has dotted lines indicating the position of the operating-levers and their attachments, and the operating devices of said drop-doors in other required positions, as will be hereinafter explained. Fig. 2 is a plan view of the machine having its bottom closed. The remaining figures are all perspective views of detached parts, of which Fig. 3 is an adjustable plow and elevator-supporting frame. Fig. 4 is a pair of cogged segments attached to a shaft for operating the supporting-frame, Fig. 3. Fig. 5 is a supporting-frame for the lower end of the elevator-chain. Fig. 6 is one of a pair of supporting-guides, in which the frame, Fig. 3, slides in its adjustments. Fig. 7 is a pair of sprocket-wheels attached to a shaft, over which the endless elevator-chain runs at its lower end. Fig. 8 is one section of the endless elevator-chain (enlarged scale) having upward or outward projecting flanges *r*. Fig. 9 is one of a pair of hook-links (enlarged scale) used for coupling a series of sections, Fig. 8, together, or one to the other, forming a chain. Fig. 10 is one of a series of hoes or scrapers, (enlarged scale also,) which is to be attached to the endless elevator-chain. Fig. 11 is the elevator-trough. Fig. 12 is the plow. Fig. 13 is a supporting-stirrup, into which the lower or forward end of the trough, Fig. 11, and rear end of the plow, Fig. 12, rest and are fastened. Figs. 14 and 15 constitute a hinge and support for the rear or upper end of the elevator-trough. Fig. 16 is part of the shifting device for shifting the elevating mechanism in and out of gear with the main drive-wheels of the machine. Fig. 17 is one of the combined trap-door and bell-crank supports. Fig. 18 is one bell-crank for operating the trap-doors of the machine. Fig. 19 is one of the links used for coupling the trap-doors with the rear upward arms of the bell-cranks for supporting said doors near their rearward edges, and for closing them after dumping. Fig. 20 is a trap-door detached; and Fig. 21 is one of a pair of adjustable followers, which work in the slots of the arms K' of the supporting-frame, Fig. 5.

In more minutely describing the several parts of my machine, A are the main traveling-wheels, playing on the ends of an axle, A''.

A' are internally-geared cog-wheels, fastened to the spokes of the wheels A, and serving as drive-wheels to the elevating mechanism by gearing with the pinions $a''$.

B are the sides and rear end of the excavator dirt-carrying box.

C are the supporting-rails or frame-work of the forward part of the machine, to which the plowing and elevating devices are attached.

D is a wheel pivoted to the forward ends of the rails C by means of a fifth-wheel, P, so as to be turned freely in different directions under said frame-work, when operated by a tongue working between the projecting flanges Q of the fifth-wheel.

R is a pair of standards, having a cross connecting-bar, and fastened to the rails C, constituting a frame-work upon which the seat R' is mounted.

E is a plow fastened in the forward end of a metallic supporting-stirrup, G, so that its concave surface will be even with the face of the concave center elevation of the said stirrup.

F is a concave metallic trough, for conveying dirt from the plow to the box of the machine. It is also fastened to the stirrup G. Said stirrup G has curved arms G' diverging outward and upward, and coupled, by means of pins or bolts forming pivot-connections at $g$, to the inner sides of the bars L of the supporting-frame, Fig. 3. The rearward or upper end of the trough F is fastened to and supported by a rest, F', Fig. 14. Said rest is connected by a hinge-coupling to a plate, F'', Fig. 15, and said plate is fastened to the inner side of the excavator-box at its forward end, thereby forming a pivoted support for the trough F. The supporting-guides L'', Fig. 6, are fastened to the inner sides of the rails C, in rear of the adjustable supporting-frame, Fig. 3, in such a manner that the back edges of said bars L will slide vertically in them while said frame and the parts attached thereto are being adjusted. Said frame, Fig. 3, has its bearings in said guides L'', and is oscillated vertically by means of the cogged segments M, Fig. 4, which work in cogs on the forward edges of the bars L. Said segments are rigid on the shaft N, and are operated by means of a lever, N', on the end of the shaft N, and held in the different required positions by means of a spring-catch attached to the said lever, which catch takes in notches in the verge of a curved rack, $w$.

The chain-supporting frame, Fig. 5, consists of a pair of slotted arms, K', which have inward-extending flanges at their upper ends, and which are fastened by bolting to the ends of a connecting-bar, K. Said arms also have followers V, Fig. 21, fitting in their slots, with the stems of said followers extending through holes in the flanges of said arms and the bar K. Said followers are provided with rabbets on their sides, so that they will fit and slide lengthwise in the slots of the arms K'. They also have holes in them, used as bearings for the shaft V', Fig. 7, which shaft rests in them. Coiled springs K'' are also provided, encircling their stems, which springs press against their shoulders and the flanges on the ends of the arms K', by which means elasticity is given to the parts having bearings in said followers, which serve the purpose of taking up the slack and tightening the elevator-chain over the sprocket-wheels I, hereinafter described. The said supporting-frame, Fig. 5, is attached by pivot-connections to the supporting-frame, Fig. 3, at $e$, by means of coupling pins or bolts being passed through the holes $e$ and $e'$ in the frames, Figs. 3 and 5. The side bars, L, of the supporting-frame, Fig. 3, are provided with lugs X''', which lugs project from their inner sides and serve as rests for the frame, Fig. 5, thereby preventing its rearward end from dropping too low, thereby limiting the downward movement of its rear end; but it is allowed a free upward movement, by rotating on its pivot-connections at $e\,e'$, so that the chain H may yield to pressure caused by large chunks of dirt or other substances passing upward in the trough F, in which event the rear end of the frame, Fig. 5, is raised from its bearings or rests (lugs X''') by means of the sprocket-wheels I. The shaft V', Fig. 7, has its bearings in the holes of the followers V, and has on it a pair of sprocket-wheels, I. The shaft $a$ (shown in Figs. 1 and 2) is also provided with a pair of similar sprocket-wheels, I, and these two pairs of sprocket-wheels carry an endless-chain elevator, H. Said chain is also provided with hoes or scrapers H' fastened to it, which hoes stand outward and incline slightly forward, and which, as the chain is carried forward by the action of the sprocket-wheels I, scrape the dirt from the plow E, up the trough F, to the box B.

The chain H consists of the sections, Fig. 8, and the hook-links $h$, Fig. 9. Said links $h$ are used in pairs, (one on each side of the chain,) and serve to connect the sections, Fig. 8, in a continuous chain. The sections, Fig. 8, and the hook-links $h$ are united by folding them back or outward until the sloped ends of the ribs $t$ on the links $h$ will pass through the notches $i''$ in the cross-bars of the filled links $i'$, when, by straightening them out, they are secured from parting while in use. In working, the outer or open links, $i$, of said chain take over the sprockets on the wheels I, which wheels are on both of the shafts $a$ and V'. To the cross-connecting-bars of the sections, Fig. 8, are attached flanges $r$, which flanges serve as a means of strengthening said cross-bars and of fastening the hoes H' to the chain H, and for stiffening thin hoes, which is desirable, as thin hoes can be more easily pressed into dirt than thick ones.

As a means of stopping the motion of the elevator-chain when not needed, and for starting it again when motion is required, an improved shifting device is provided for disconnecting the pinions $a''$ from the cog-wheels A', or vice versa, as circumstances may demand. Said shifting device consists of a pair of spring-bars, $n'''$, which are pivoted at their rear ends to a set of uprights, c, and also of a pair of semicircular cams, n'''', which cams are rigidly fastened on a shaft, n', and the said shaft pivoted with its bearings in an additional set of uprights c. Said cams form rests for the forward or loose ends of said spring-bars n'''. The said spring-bars n''' are also provided with pillow-blocks a' resting on them, which pillow-blocks are the bearings for the shaft a, and all of the said parts are mounted on the sides B of the excavator-box. The shaft n' is also provided with a crank, n'', on one end, which crank, by means of a connecting-rod, n, is coupled also to the downward-extending end of the lever N', by which means, as the top of the lever N' is thrown forward in the position indicated by the dotted lines in Fig. 1, which is done while raising the plow out of the ground, the crank n'' is pressed backward, thereby rotating the shaft n' so that the flat sides of the cams n'''' will be upward, which will cause the forward ends of the bars n''' to drop, thereby lowering the shaft a, whose bearings are in the boxes a', and shifting the pinions a'' out of gear with the cog-wheels A'. For shifting the said pinions in gear again a reverse movement is made by said parts, which movement of the lever N' also lowers the plow for action.

The trap-doors T, Fig. 20, constituting the bottom of the dirt-conveying box, have pivots X' resting in the lower ends of the supporting-plates X. The said plates are fastened to the outer sides of said box in a vertical position, suitable for receiving the said pivots in holes made in their lower ends. They are also provided with wrists X'', upon which wrists bell-cranks s are pivoted. The said bell-cranks have their forward arms forked over, and are pivoted to the coupling-bars o'', which bars are arranged respectively one on each side of the machine. The said coupling-bars are long enough to connect and couple together all of the said bell-cranks on their respective sides, and are coupled at their forward ends to connecting-rods o', which rods are also connected, one with the lever o on the end of the shaft o''' and the other to an arm on the opposite end of the said shaft. The bell-cranks s have their rearward arms forked, in which forks links s' are suspended by means of pins or bolts being passed through their upper ends and the forks of the said arms. The lower ends of the said links constitute supports for the doors T by means of projecting ends v of rods fastened to their under sides. By this combined means as the shaft o''' is rotated by a forward movement of the lever o the bell-cranks s are also (by the intermediate connections with said shaft) made to rotate forward, causing their rearward arms to rise, and, by means of the connecting-links s', to close the doors T. The said doors are opened for dumping a load by means of a reverse movement of said parts. By this mechanism for operating said doors each door is allowed (by having yielding bearings in the links s') to have an automatic or independent upward action when striking any obstruction in opening, so as to not interfere with the action of the other doors, by which means, also, the said doors are raised after dumping and are supported against the weight of dirt resting on them at points in rear of their centers, thus throwing the principal weight on the points v, and thereby relieving the pivots X' of the strain that would otherwise be upon them.

Having thus fully described my invention, so as to enable others skilled in the art to which it appertains to understand the same, what I claim as new, and desire to secure by Letters Patent, is—

1. In combination with the plow E, trough F, and adjusting-frame, Fig. 3, the stirrup G, being constructed, as herein shown, to extend under and receive the lower end of the trough, as and for the purposes substantially as specified.

2. In combination with the elevator-trough F and the box of an excavating-machine, the trough-rest F', as combined also with the hinge-plate F'', substantially as shown, and for the purposes specified.

3. In combination with the plow E, trough F, stirrup G, frame-pieces C, supporting-guides L'', and segments M, the adjusting-frame, Fig. 3, consisting of the side bars, L, and connecting-bar L', substantially as herein shown, and for the purposes specified.

4. In combination with the frame-pieces C, the shaft N, and the adjusting-frame, Fig. 3, the segments M, fastened on said shaft N, substantially as shown, and for the purposes specified.

5. In combination with shafts V' and a and the sprocket-wheels I, as arranged in pairs on said shafts, the elevator-chain H, composed of the sections, Fig. 8, links h, Fig. 9, and hoes H', Fig. 10, all constructed and combined substantially as herein shown, and for the purposes specified.

6. In combination with the chain H, shafts V' and a, the sprocket-wheels I, and the adjusting-frame, Fig. 3, the chain-supporting frame, Fig. 5, consisting of the arms K', bar K, followers V, and springs K'', substantially as shown, and for the purposes specified.

7. In combination with the frames, Figs. 3 and 5, the lugs X, substantially as shown, and for the purpose specified.

8. In combination with an excavator-box, the shaft a, pinions a'', gear-wheels A', and lever N', the shifting device, consisting of the pivoted bars n''', uprights c, shaft n', cams n'''', crank n'', and connecting-rod n, all substantially as herein shown, and for the purposes specified.

9. In combination with the sides B of an excavator-box, the drop-doors T, and the lever o, the mechanism herein shown for operating the drop-doors, consisting of the bell-cranks s, links s', coupling-bars o'', connecting-rods o', and supporting-plates X, having wrists X″, and being also provided with holes for the bearings of the doors T, all substantially as shown, and for the purposes specified.

10. In combination with the sides and ends of an excavator-box and the door-operating devices above described, the drop-doors T, having pivots X′ attached to them near their forward edges, and also supporting-rods, with projecting ends $v$ as bearings, attached on their under sides in rear of their centers, substantially as shown, and for the purposes specified.

FREDRICK JONAS.

Witnesses:
FRED HOPE,
W. H. CAMPBELL.